United States Patent
Wang et al.

(10) Patent No.: US 12,313,923 B2
(45) Date of Patent: May 27, 2025

(54) LIGHT SHIELDING PLATE ASSEMBLY AND CONTROL METHOD THEREOF, CONTROL DEVICE AND VEHICLE

(71) Applicants: Beijing BOE Sensor Technology Co., Ltd., Beijing (CN); BOE Technology Group Co., Ltd., Beijing (CN)

(72) Inventors: Yongbo Wang, Beijing (CN); Wei Sun, Beijing (CN); Chen Meng, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 535 days.

(21) Appl. No.: 17/764,916

(22) PCT Filed: May 18, 2021

(86) PCT No.: PCT/CN2021/094238
§ 371 (c)(1),
(2) Date: Mar. 29, 2022

(87) PCT Pub. No.: WO2021/258919
PCT Pub. Date: Dec. 30, 2021

(65) Prior Publication Data
US 2022/0382087 A1    Dec. 1, 2022

(30) Foreign Application Priority Data
Jun. 22, 2020 (CN) .......................... 202010573253.3

(51) Int. Cl.
G02F 1/133   (2006.01)
B60J 3/02    (2006.01)
(Continued)

(52) U.S. Cl.
CPC ............ *G02F 1/13312* (2021.01); *B60J 3/02* (2013.01); *B60J 3/04* (2013.01); *G02F 1/137* (2013.01);
(Continued)

(58) Field of Classification Search
CPC .. G02F 1/13312; G02F 1/137; G02F 2203/01; G02F 2203/48; G06F 3/013; B60J 3/02; B60J 3/04
(Continued)

(56) References Cited

U.S. PATENT DOCUMENTS

2005/0264022 A1   12/2005   Suzuki et al.
2016/0363993 A1   12/2016   Leng

FOREIGN PATENT DOCUMENTS

CN   101607520 A  *  12/2009
CN   102241235 A     11/2011
(Continued)

OTHER PUBLICATIONS

Kiaochuan Zhao. "MATLAB image processing-capacity improvement and application case." ISBN 978-7-5124-1317-7 (2014).
(Continued)

*Primary Examiner* — Michael H Caley
*Assistant Examiner* — William D Peterson
(74) *Attorney, Agent, or Firm* — IPro, PLLC

(57) ABSTRACT

The present disclosure provides a light shielding plate assembly and a control method thereof, a control device, and a vehicle. The image collecting module in the light shielding plate assembly is configured to obtain image information of the transparent panel and the human eye; the control module is configured to determine target position information of a gaze point of the human eye positioned on the transparent panel according to the image information, and determine a target control area corresponding to the target position
(Continued)

information on the transparent panel; the detection module is configured to: detect optical information when the light passes through the target control area and arrives at the human eye; the control module is further configured to: adjust the light transmittance of the transparent panel in the target control area according to the optical information, so that the optical information is within a preset range.

16 Claims, 7 Drawing Sheets

(51) Int. Cl.
*B60J 3/04* (2006.01)
*G02F 1/137* (2006.01)
*G06F 3/01* (2006.01)

(52) U.S. Cl.
CPC ...... *G02F 2203/01* (2013.01); *G02F 2203/48* (2013.01); *G06F 3/013* (2013.01)

(58) Field of Classification Search
USPC ........................................................ 359/245
See application file for complete search history.

(56) References Cited

FOREIGN PATENT DOCUMENTS

| CN | 103985334 | A | | 8/2014 | |
| CN | 206938400 | U | | 1/2018 | |
| CN | 109808464 | A | | 5/2019 | |
| CN | 110435400 | A | * | 11/2019 | |
| CN | 111114252 | A | * | 5/2020 | ............ B60J 3/04 |
| CN | 111591111 | A | | 8/2020 | |
| CN | 113727869 | A | | 11/2021 | |
| EP | 4035915 | A1 | | 8/2022 | |
| JP | 3688637 | B2 | | 8/2005 | |
| WO | 9624881 | A1 | | 8/1996 | |

OTHER PUBLICATIONS

CN 202010573253.3 first office action.
PCT/CN2021/094238 international search report and written opinion.

* cited by examiner

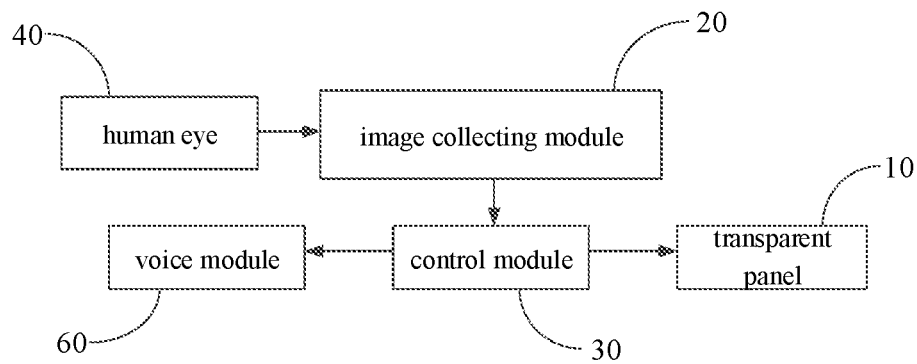
FIG. 1
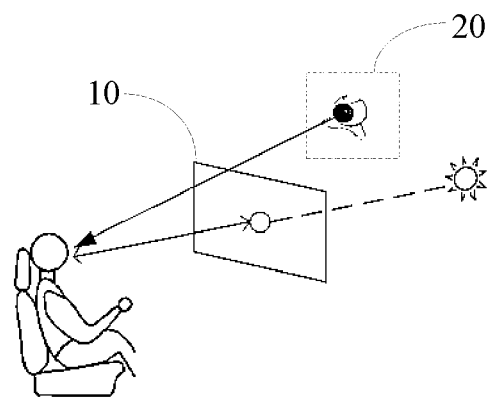
FIG. 2
| 0010 | 0010 | — — — — | 0010 |
|------|------|---------|------|
| 0010 | 0010 | — — — — | 0010 |
| 0010 | 0010 | — — — — | 0010 |
| 0010 | 0010 | — — — — | 0010 |
| 0010 | 0010 | — — — — | 0010 |
| 0010 | 0010 | — — — — | 0010 |
| 0010 | 0010 | — — — — | 0010 |
| 0010 | 0010 | — — — — | 0010 |
| 0010 | 0010 | — — — — | 0010 |
| 0010 | 0010 | — — — — | 0010 |
| 0010 | 0010 | — — — — | 0010 |
| 0010 | 0010 | — — — — | 0010 |
FIG. 3

| 0010 | 0010 | ----- | 0010 |
|------|------|-------|------|
| 0010 | 0010 | ----- | 0010 |
| 0010 | 0010 | ----- | 0010 |
| 0010 | 0010 | ----- | 0010 |
| 0010 | 0010 | ----- | 0010 |
| 0010 | 1010 | ----- | 0010 |
| 0010 | 1010 | ----- | 0010 |
| 0010 | 1010 | ----- | 0010 |
| 0010 | 0010 | ----- | 0010 |
| 0010 | 0010 | ----- | 0010 |
| 0010 | 0010 | ----- | 0010 |
| 0010 | 0010 | ----- | 0010 |

LIGHT SHIELDING PLATE ASSEMBLY AND CONTROL METHOD THEREOF, CONTROL DEVICE AND VEHICLE

CROSS-REFERENCE TO RELATED APPLICATION

This application is the U.S. national phase of PCT Application No. PCT/CN2021/094238 filed on May 18, 2021, which claims priorities of the Chinese patent application No. 202010573253.3 filed on Jun. 22, 2020, which are incorporated herein by reference in their entireties.

TECHNICAL FIELD

The present disclosure relates to the field of light shielding technology, and more particularly to a light shielding plate assembly and a control method thereof, a control device, and a vehicle.

BACKGROUND

During driving a car, we often encounter the problem of visual dizziness caused by direct sunlight. In order to solve this problem, the current commonly used method includes wearing sun glasses. Although this method can prevent the problem of dizziness, it will also lead to darkening of the exterior scene and poor vision in the absence of sunlight.

SUMMARY

The purpose of the present disclosure is to provide a sunshield module and a control method thereof, a control device, and a vehicle.

In order to achieve the above object, the present disclosure provides the following technical solutions.

A first aspect of the present disclosure provides a light shielding plate assembly, including: a transparent panel, an image collecting module, a detection module, and a control module; wherein, the transparent panel is configured to block a light passing through the transparent panel and arriving at a human eye, and a light transmittance of the transparent panel is adjustable; the image collecting module is located on a side of the transparent panel away from the human eye, and is configured to obtain image information of the transparent panel and the human eye; the control module is configured to: determine target position information of a gaze point of the human eye positioned on the transparent panel according to the image information, and determine a target control area corresponding to the target position information on the transparent panel; the detection module is configured to: detect optical information when the light passes through the target control area and arrives at the human eye; the control module is further configured to: adjust the light transmittance of the transparent panel in the target control area according to the optical information, so that the optical information is within a preset range.

Optionally, the image collecting module is specifically configured to: collecting a first image including only the transparent panel, and a second image including both the transparent panel and the human eye; the control module includes a control unit, and the control unit is configured to: process the first image to obtain a set of values corresponding to each pixel in the first image to form a first numerical value matrix corresponding to the first image, establish a correspondence table between the first numerical value matrix and coordinate position information of the transparent panel; process the second image to obtain a set of values corresponding to each pixel in the second image, to form a second numerical value matrix corresponding to the second image; compare the first numerical value matrix and the second numerical value matrix to determine a target numerical value in the first numerical value matrix that is different from the second numerical value matrix, and determine position information corresponding to the target numerical value from the correspondence table as the target location information; the control unit is further configured to: determine an area value of the control area to be divided of the transparent panel according to a distance between the human eye and the transparent panel and a field of view of the human eye; divide the transparent panel into a plurality of control areas according to the area value; determine a control area corresponding to the target location information among the plurality of control areas as a target control area.

Optionally, the transparent panel is divided into a plurality of control areas; the detection module includes: a plurality of photosensitive units corresponding to the plurality of control areas in a one-to-one manner; a target photosensitive unit in the target control area is used to detect light intensity information formed by a light in the target control area when the light passes through the target control area and arrives at the human eye; the control module includes a control unit, and the control unit is configured to: obtain the light intensity information, and compare the light intensity information with a preset light intensity threshold, when the light intensity information is greater than the light intensity threshold, adjust light transmittance of the target control area, so that light intensity information of the target control area is smaller than the light intensity threshold.

Optionally, the image collecting module is multiplexed as the detection module; the control module includes a control unit; the image collecting module is specifically configured to: collect brightness information of a light arriving at the human eye when the light passes through the target control area and arrives at the human eye, and transmit the brightness information to the control unit; the control unit is configured to: compare the brightness information with a preset brightness threshold, and when the brightness information is greater than the brightness threshold, adjust the light transmittance of the target control area, so that the brightness information of the light arriving at the human eye is less than the brightness threshold.

Optionally, the transparent panel is divided into a plurality of control areas, and the transparent panel includes a first electrode and a second electrode located in each of the plurality of control areas; the control module includes: a control unit, and a plurality of processing units respectively connected to the control unit, the plurality of processing units are in one-to-one correspondence with the plurality of control areas; each processing unit is coupled to the first electrode and the second electrode in a corresponding control area; the control unit is configured to: output a corresponding target control signal according to the optical information; the target processing unit corresponding to the target control area is configured to: convert the target control signal into a first target driving signal and a second target driving signal; and transmit the first target driving signal to the first electrode in the target control area connected to the target processing unit and transmit the second target driving signal to the second electrode in the target control area connected to the target processing unit; to adjust the light transmission of the transparent panel in the target control area so that the optical information is within the preset range.

Optionally, the transparent panel is divided into a plurality of control areas, and the transparent panel includes a first electrode and a second electrode located in each of the plurality of control areas; the control module includes: a control unit, a first driver chip coupled to the control unit, and a second driver chip coupled to the control unit, the first driver chip is coupled to the first electrode in each control area, and the second driver chip is coupled to the second electrode in each control area; the control unit is configured to: output a corresponding target control signal according to the optical information; the first driver chip is configured to: output a corresponding first target driving signal to the first electrode in the target control area under the control of the target control signal; the second driver chip is configured to: output a corresponding second target driving signal to the second electrode in the target control area under the control of the target control signal; to adjust the light transmittance of the transparent panel in the target control area, so that the optical information is within the preset range.

Optionally, the control module comprises: a first gamma chip and a second gamma chip; the first gamma chip is coupled to the first driver chip, and is used for adjusting an amplitude of a first driving signal outputted by the first driver chip; the second gamma chip is coupled to the second driver chip, and is used for adjusting an amplitude of a second driving signal outputted by the second driver chip.

In a second aspect, a vehicle includes the light shielding plate assembly.

In a third aspect, a control method of a light shielding plate assembly, the light shielding plate assembly includes a transparent panel, an image collecting module, a detection module, and a control module, wherein, the transparent panel is configured to block a light passing through the transparent panel and arriving at a human eye, and a light transmittance of the transparent panel is adjustable; the image collecting module is located on a side of the transparent panel away from the human eye; the control method includes: obtaining, by the image collecting module, image information of the transparent panel and the human eye; determining, by the control module, target position information of a gaze point of the human eye positioned on the transparent panel according to the image information, and determining a target control area corresponding to the target position information on the transparent panel; detecting, by the detection module, optical information when the light passes through the target control area and arrives at the human eye; adjusting, by the control module, the light transmittance of the transparent panel in the target control area according to the optical information, so that the optical information is within a preset range.

Optionally, the step of obtaining, by the image collecting module, the image information of the transparent panel and the human eye includes: collecting a first image including only the transparent panel, and a second image including both the transparent panel and the human eye; the step of determining, by the control module, target position information of a gaze point of the human eye positioned on the transparent panel according to the image information includes: processing the first image to obtain a set of values corresponding to each pixel in the first image to form a first numerical value matrix corresponding to the first image, establish a correspondence table between the first numerical value matrix and coordinate position information of the transparent panel; processing the second image to obtain a set of values corresponding to each pixel in the second image, to form a second numerical value matrix corresponding to the second image; comparing the first numerical value matrix and the second numerical value matrix to determine a target numerical value in the first numerical value matrix that is different from the second numerical value matrix, and determine position information corresponding to the target numerical value from the correspondence table as the target location information; the step of determining a target control area corresponding to the target position information on the transparent panel includes: determining an area value of the control area to be divided of the transparent panel according to a distance between the human eye and the transparent panel and a field of view of the human eye; dividing the transparent panel into a plurality of control areas according to the area value; determining a control area corresponding to the target location information among the plurality of control areas as a target control area.

Optionally, the transparent panel is divided into a plurality of control areas; the detection module includes: a plurality of photosensitive units corresponding to the plurality of control areas in a one-to-one manner; the control module 30 includes a control unit; the step of detecting, by the detection module, the optical information corresponding to the light passing through the target control area and arriving at the human eye specifically includes: detecting, by a target photosensitive unit in the target control area, light intensity information formed by a light in the target control area when the light passes through the target control area and arrives at the human eye; the step of adjusting, by the control module, the light transmittance of the transparent panel in the target control area according to the optical information, so that the optical information is within a preset range include: obtaining, by the control unit, the light intensity information, comparing the light intensity information with a preset light intensity threshold, and when the light intensity information is greater than the light intensity threshold, adjusting light transmittance of the target control area, so that light intensity information of the target control area is smaller than the light intensity threshold.

Optionally, the image collecting module is multiplexed as the detection module; the control module includes a control unit; the step of detecting, by the detection module, the optical information when the light passes through the target control area and arrives at the human eye specifically includes: collecting brightness information of a light arriving at the human eye when the light passes through the target control area and arrives at the human eye, and transmitting the brightness information to the control unit; the step of adjusting, by the control module, the light transmittance of the transparent panel in the target control area according to the optical information, so that the optical information is within a preset range include:

comparing, by the control unit, the brightness information with a preset light brightness threshold, and when the brightness information is greater than the light brightness threshold, adjusting the light transmittance of the target control area so that the bright information of the light arriving at the human eye is less than the light brightness threshold.

Optionally, the transparent panel is divided into a plurality of control areas, the transparent panel includes a first electrode and a second electrode located in each of the plurality of control areas; the control module includes: a control unit, and a plurality of processing units respectively connected to the control units, the processing units are in one-to-one correspondence with the plurality of control areas; each processing unit is coupled to the first electrode and the second electrode in a corresponding control area; the step of adjusting, by the control module, the light transmittance of the transparent panel in the target control area according to the optical information, so that the optical information is within a preset range, include:

outputting, by the control unit, a corresponding target control signal according to the optical information; converting, by the target processing unit corresponding to the target control area, the target control signal into a first target driving signal and a second target driving signal; and transmitting the first target driving signal to the first electrode in the target control area coupled to the target processing unit, and transmitting the second target driving signal to the second electrode in the target control area coupled to the target processing unit; adjusting the light transmittance of the transparent panel in the target control area, so that the optical information is within the preset range.

Optionally, the transparent panel is divided into a plurality of control areas, the transparent panel includes a first electrode and a second electrode located in each of the plurality of control areas; the control module includes: a control unit, a first driver chip coupled to the control unit, and a second driver chip coupled to the control unit, the first driver chip is coupled to the first electrode in each control area, and the second driver chip is coupled to the second electrode in each control area; the control unit is configured to output a corresponding target control signal according to the optical information; the first driver chip is configured to: output a corresponding first target driving signal to the first electrode in the target control area under the control of the target control signal; the second driver chip is configured to: output a corresponding second target driving signal to the second electrode in the target control area under the control of the target control signal; to adjust the light transmittance of the transparent panel in the target control area, so that the optical information is within the preset range.

Optionally, the control module comprises a first gamma chip and a second gamma chip; the first gamma chip is coupled to the first driver chip, and the second gamma chip is coupled to the second driver chip; the control method further includes: adjusting, by the first gamma chip, an amplitude of a first driving signal outputted by the first driver chip; adjusting, by the second gamma chip, an amplitude of a second driving signal outputted by the second driver chip;

In a fourth aspect, a control device of a light shielding plate assembly, applied to a vehicle, the control device comprising: a memory and a processor, the processor being configured to execute the following instructions stored in the memory: obtaining image information of the transparent panel and the human eye; determining target position information of a gaze point of the human eye positioned on the transparent panel according to the image information, and determining a target control area corresponding to the target position information on the transparent panel; detecting optical information when the light passes through the target control area and arrives at the human eye; adjusting the light transmittance of the transparent panel in the target control area according to the optical information, so that the optical information is within a preset range.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an improper limitation of the present disclosure.

FIG. 1 is a schematic diagram of a first module of a light shielding plate assembly provided by an embodiment of the present disclosure;

FIG. 2 is a schematic diagram of a position relationship among an image collecting module, a transparent panel, and a human eye according to an embodiment of the present disclosure;

FIG. 3 is a schematic diagram of a first numerical value matrix provided by an embodiment of the present disclosure;

DETAILED DESCRIPTION

Figures 4, 5:
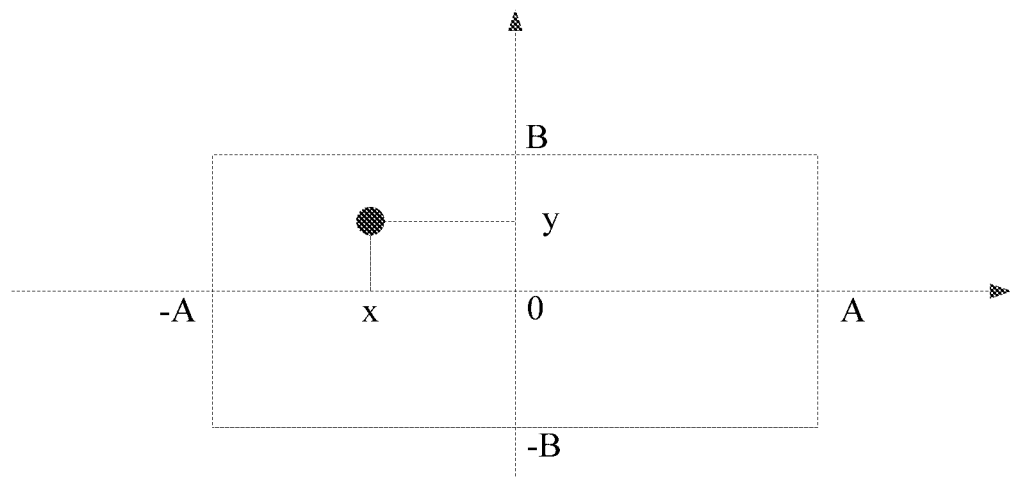
FIG. 4 is a schematic diagram of a second numerical value matrix provided by an embodiment of the present disclosure.
FIG. 5 is a schematic diagram of coordinates of a transparent panel and a viewpoint provided by an embodiment of the present disclosure.

In order to further illustrate the light shielding plate assembly, the control method thereof, the control device, and the vehicle provided by the embodiments of the present disclosure, the following detailed description is given with reference to the accompanying drawings.

Referring to FIG. 1 and FIG. 2, an embodiment of the present disclosure provides a light shielding plate assembly, including: a transparent panel 10, an image collecting module 20, a detection module and a control module 30; wherein, The transparent panel 10 is configured to block a light passing through the transparent panel 10 and arriving at a human eye 40, and a light transmittance of the transparent panel 10 is adjustable;

The image collecting module 20 is located on a side of the transparent panel 10 away from the human eye 40, and is configured to obtain image information of the transparent panel 10 and the human eye 40;

The control module 30 is configured to: determine target position information of a gaze point of the human eye 40 positioned on the transparent panel according to the image information, and determine a target control area corresponding to the target position information on the transparent panel 10;

The detection module is configured to: detect optical information when the light passes through the target control area and arrives at the human eye 40;

The control module 30 is further configured to: adjust light transmittance of the transparent panel 10 in the target control area according to the optical information, so that the optical information is within a preset range.

Specifically, the specific types of the transparent panel 10 are various. Exemplarily, the transparent panel 10 is a smart dimming glass panel. The smart dimming glass has the advantage of high transmittance, and the technical problem of opacity or low transmittance of common light shielding plate or transparent display light shielding plate is solved by using the transparent panel 10 made of the smart dimming glass. Exemplarily, the transparent panel 10 includes a liquid crystal panel. The light transmittance of the transparent panel 10 is adjustable. Exemplarily, the transparent panel 10 can be divided into a plurality of control areas, each control area includes a first electrode and a second electrode arranged oppositely, and a liquid crystal layer arranged between the first electrode and the second electrode; by controlling the driving signal transmitted to the first electrode and the second electrode, the liquid crystal can be controlled to deflect accordingly, thereby changing the light transmittance of the corresponding control area.

The specific structure of the image collecting module 20 is various. Exemplarily, the image collecting module 20 includes a camera. The image collecting module 20 can obtain the image information of the transparent panel 10 and the human eye 40 in real time, and can obtain an eye movement feature of the human eye 40 by tracking the eyeball. Exemplarily, the transparent panel 10 is located between the image collecting module 20 and the human eye 40, that is, the image collecting module 20 is located on the side of the transparent panel 10 away from the human eye 40. Exemplarily, when the light shielding plate assembly is used in a vehicle, the image collecting module 20 may be located between the transparent panel 10 and the windshield of the vehicle. It should be noted that the setting position of the image collecting module 20 needs to satisfy the condition that the image collecting module 20 can detect both the transparent panel 10 and the human eye 40. Since the initial state of the transparent panel 10 is a transparent state, the installation position of the image collecting module 20 can be adjusted reasonably to satisfy the above condition.

Exemplarily, the control module 30 is arranged at an edge of the transparent panel 10, or at least part of the control module 30 can be integrated on the transparent panel 10. The control module 30 can obtain the angle information of the line of sight of the human eye 40 according to the image information, so as to determine the target position information of the gaze point of the human eye 40 positioned on the transparent panel 10. Exemplarily, the target location information includes coordinate information.

When the transparent panel 10 is divided into a plurality of control areas, each control area has a corresponding coordinate information range, and if the target position information is located in a coordinate information range corresponding to one control area, then the one control area is the target control area corresponding to the target location information. It should be noted that the target location information may correspond to one or more control areas.

The detection module can detect the optical information when the light passes through the target control area and arrives at the human eye 40; exemplarily, the optical information includes brightness information or light intensity information.

The control module 30 can obtain the optical information from the detection module, or the detection module can transmit the optical information to the control module 30 after detecting the optical information. The control module 30 adjusts the light transmittance of the target control area based on the optical information, so that a value corresponding to the optical information can be within a preset range.

In practical application, the above-mentioned light shielding plate assembly includes the following control process.

The image collecting module 20 obtains the image information of the transparent panel 10 and the human eye 40; the control module 30 determines the target position information of the gaze point of the human eye 40 positioned on the transparent panel according to the image information, and determine the target control area on the transparent panel 10 corresponding to the target position information; the detection module detects the optical information when the light passes through the target control area and arrives at the human eye 40; the control module 30 also adjusts the light transmittance of the transparent panel 10 in the target control area according to the optical information, so that the optical information is within a preset range.

It is worth noting that during the actual application, each module of the light shielding plate assembly can be in a real-time working state. The image collecting module 20 can collect image information in real time, the control module 30 can determine the target control area in real time, the detection module can detect optical information in real time, and the control module 30 can adjust the light transmittance of the target control area in real time according to the optical information obtained in real time.

According to the specific structure and practical application of the light shielding plate assembly provided by the above embodiments, in the light shielding plate assembly provided by the embodiment of the present disclosure, the image collecting module 20 obtains the image information of the transparent panel 10 and the human eye 40; the control module 30 can determine the target position information of the gaze point of the human eye 40 positioned on the transparent panel 10 according to the image information, and determine the target control area corresponding to the target position information on the transparent panel 10; the detection module can detect the optical information when the light passes through the target control area and arrives at the human eye 40; the control module 30 can also adjust the light transmittance of the transparent panel 10 in the target control area according to the optical information, so that the optical information is within a preset range. Therefore, in the light shielding plate assembly provided by the embodiment of the present disclosure, when the strong light passes through the target control area and arrives at the human eye 40, the brightness of the light arrived at the human eye 40 can be reduced by controlling the light transmittance of the target control area, thereby avoiding the dizziness problem and the blind spot problem caused by the strong light irradiating the human eye 40. Moreover, the light shielding plate assembly provided by the embodiment of the present disclosure can automatically adjust the corresponding target control area of the transparent panel 10 to change color according to the position where the incident light arrives at the human eye 40, and ensure that other areas do not change color. The function of automatically adjusting the color change of the target control area in real time according to the lighting conditions is realized.

The light shielding plate assembly provided by the embodiment of the present disclosure combines the technical means of dimming at a plurality of areas, achieves the technical effect of automatic dimming in different areas of the transparent panel 10, and solves the technical problem of dizziness of the human eye 40 caused by direct sunlight.

When the light shielding plate assembly provided by the embodiment of the present disclosure is applied to a vehicle, the problem of visual dizziness of the human eye 40 caused by direct sunlight during driving of the vehicle can be solved, and at the same time, the occurrence of a darkened external scene and a poor visual field can be avoided.

Figure 7:
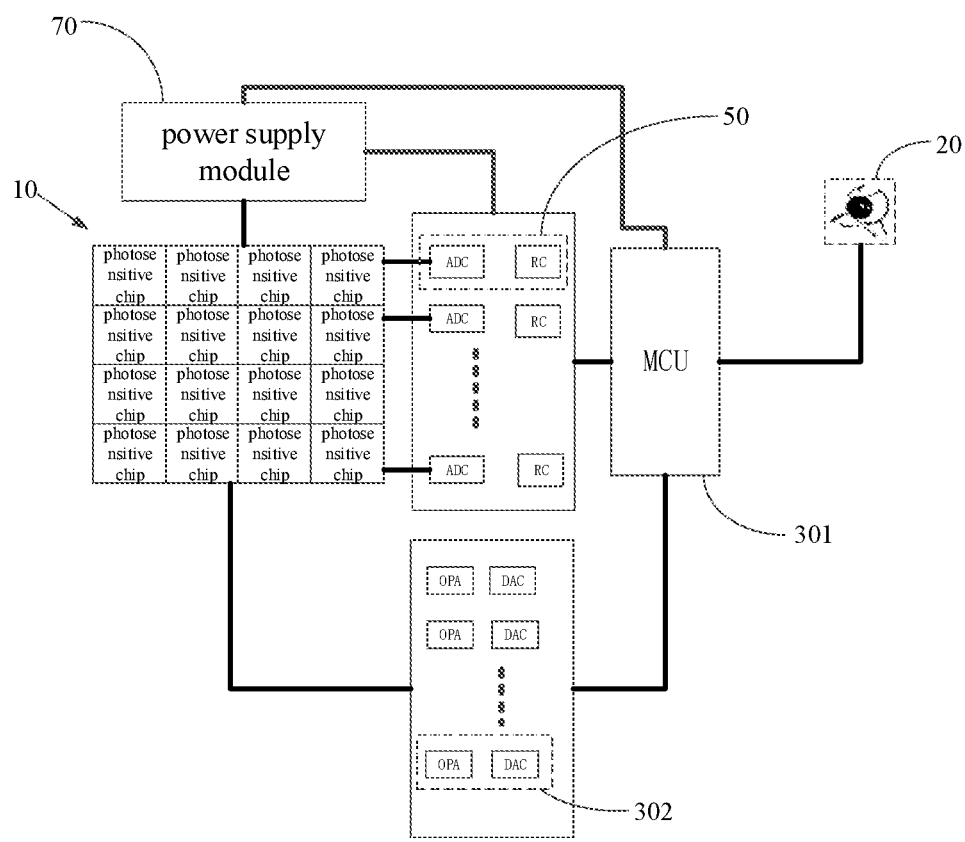
FIG. 7 is a schematic diagram of a third module of the light shielding plate assembly provided by the embodiment of the present disclosure.
Figure 9:
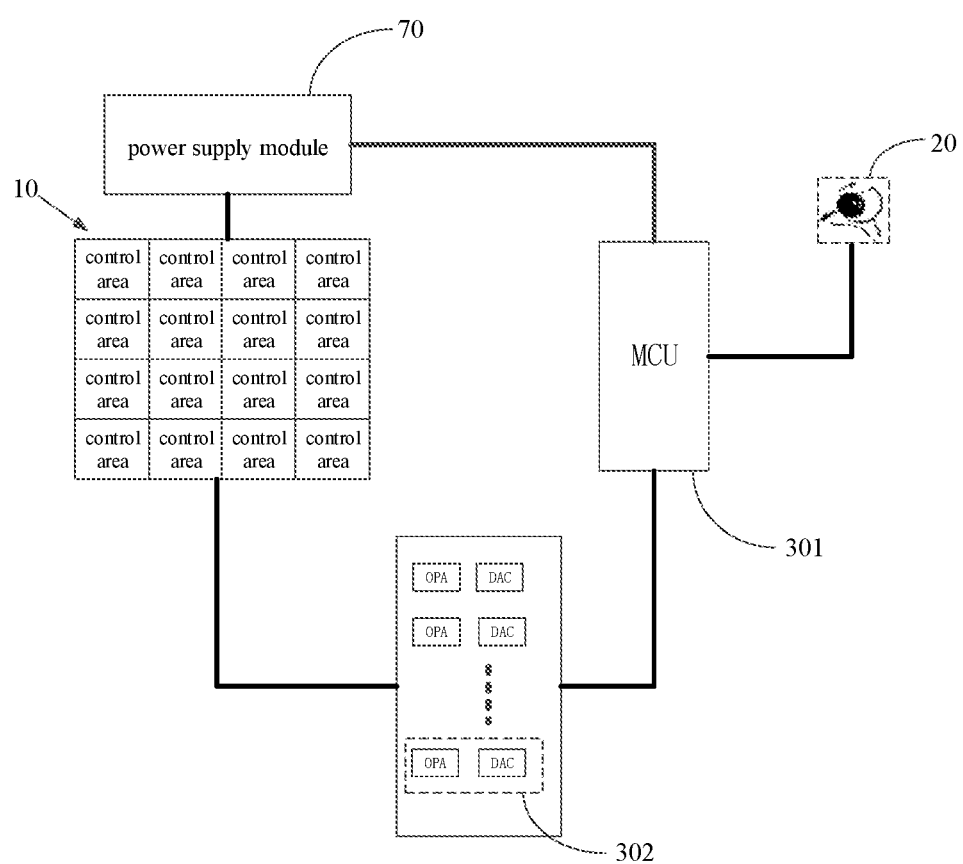
FIG. 9 is a schematic diagram of a third module of the light shielding plate assembly provided by the embodiment of the present disclosure.

As shown in FIG. 7 and FIG. 9, in some embodiments, the image collecting module 20 is specifically configured to:

collecting a first image including only the transparent panel 10, and a second image including both the transparent panel 10 and the human eye 40;

As shown in FIG. 3, the control module 30 includes a control unit 301, and the control unit 301 is configured to: process the first image to obtain a set of values corresponding to each pixel in the first image to form a first numerical value matrix corresponding to the first image, establish a correspondence table between the first numerical value matrix and coordinate position information of the transparent panel 10;

As shown in FIG. 4, the second image is processed to obtain a set of values corresponding to each pixel in the second image, to form a second numerical value matrix corresponding to the second image;

the first numerical value matrix and the second numerical value matrix are compared to determine target numerical value in the first numerical value matrix that is different from the second numerical value matrix, and determine position information corresponding to the target numerical value from the correspondence table as the target location information;

The control unit 301 is further configured to:

According to a distance between the human eye 40 and the transparent panel 10 and a field of view of the human eye 40, determine an area value of the control area to be divided of the transparent panel 10;

Divide the transparent panel 10 into a plurality of control areas according to the area value;

Determine a control area corresponding to the target location information among the plurality of control areas as a target control area.

Specifically, the image collecting module 20 can obtain a first image including only the transparent panel 10 and a second image including both the transparent panel 10 and the human eye 40, and transmit the first image and the second image to the control unit 301. Exemplarily, in the second image, the transparent panel 10 and the human eye 40 are overlapped together. It is worth noting that the camera obtains eye movement features, and the algorithm and implementation are already known in the art, which will not be repeated here.

The control module 30 includes a control unit 301. Exemplarily, the control unit 301 includes a Microcontroller Unit (MCU) control system, a Microprocessor Unit (MPU) Control system or Field Programmable Gate Array (FPGA) control system, etc.

The control unit 301 processes the first image, and specifically includes: using an image division method and an image recognition algorithm to obtain a set of values corresponding to each pixel in the first image, to form the first numeric value matrix corresponding to the first image. Exemplarily, a single-point pixel of the numerical value matrix is 4 bits. The size feature of the transparent panel 10 is pre-stored in the control unit 301, and the control unit 301 can establish a correspondence table between the first numerical value matrix and the coordinate position information of the transparent panel 10 based on the size feature.

The control unit 301 processes the second image, and specifically includes: using an image division method and an image recognition algorithm to obtain a set of values corresponding to each pixel in the second image, and form a second numeric value matrix corresponding to the second image.

The control unit 301 compares the first numerical value matrix with the second numerical value matrix, and determines a target numerical value in the first numerical value matrix that is different from the second numerical value matrix. As shown in FIG. 3 and FIG. 4, the bold values in the second numerical value matrix are different from the numerical values at the corresponding positions in the first numerical value matrix. After the target value is determined, the position information corresponding to the target value may be further determined from the correspondence table as the target position information.

The control unit 301 is further configured to determine an area value of the control area to be divided of the transparent panel 10 according to the distance between the human eye 40 and the transparent panel 10 pre-stored in the system, and the field of view of the human eye 40 (or the resolution of the human eye 40); and divide the transparent panel 10 into a plurality of control areas according to the area value.

Exemplarily, a rectangular coordinate system is established with the center of the transparent panel 10 as the coordinate center. As shown in FIG. 5, taking the center of the transparent panel 10 as the origin, the viewpoint of the human eye 40 on the transparent panel 10 can be represented by rectangular coordinates or polar coordinates. Exemplarily, the coordinate range of the transparent panel 10 obtained by the image collecting module 20 is the horizontal coordinate of (−A, A), the vertical coordinate of (−B, B); the black point in FIG. 5 is the viewpoint, and the coordinate is (x, y).

Each of the plurality of control areas corresponds to a certain coordinate range, and the control area corresponding to the target position information among the plurality of control areas can be determined according to the target position information and the coordinate range corresponding to each control area. The control area is the target control area.

In the light shielding plate assembly provided by the above embodiment, the control unit 301 can determine the first numerical value matrix corresponding to the first image and a second numerical value matrix corresponding to the second image by processing the first image and the second image collected by the image collecting module 20; by comparing the first numerical value matrix and the second numerical value matrix, determine the target position information from the determined correspondence table. The control unit 301 can further divide the transparent panel 10 into a plurality of control areas, and determine the control area corresponding to the target position information among the plurality of control areas as the target control area, thereby realizing the determination of the target control area of the gaze point of the human eye 40 on the transparent panel 10.

Figure 6:
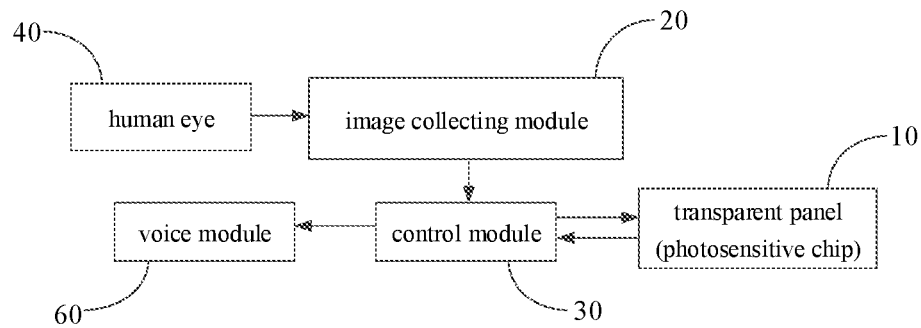
FIG. 6 is a schematic diagram of a second module of the light shielding plate assembly provided by the embodiment of the present disclosure.
Figure 8:
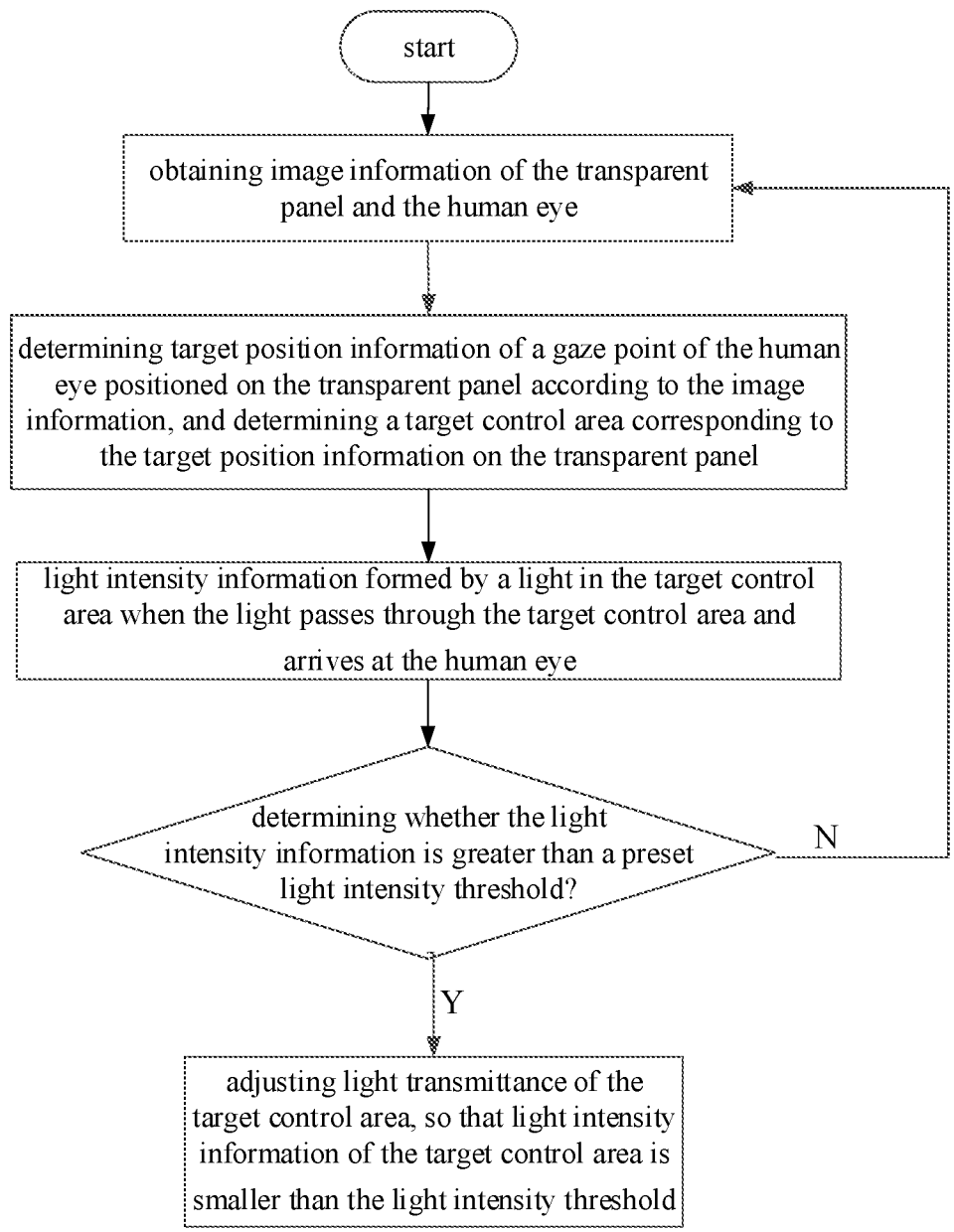
FIG. 8 is a first control flow chart of the light shielding plate assembly provided by the embodiment of the present disclosure.

As shown in FIGS. 6-8, in some embodiments, the transparent panel 10 is divided into a plurality of control areas; the detection module includes: a plurality of photosensitive units corresponding to the plurality of control areas in a one-to-one manner;

The photosensitive unit in the target control area is used to detect the light intensity information formed by the light in the target control area when the light passes through the target control area and arrives at the human eye 40;

The control module 30 includes a control unit 301, and the control unit 301 is configured to: obtain the light intensity information, and compare the light intensity information with a preset light intensity threshold, when the light intensity information is greater than the light intensity threshold, adjust the light transmittance of the target control area, so that the light intensity information of the target control area is smaller than the light intensity threshold.

Specifically, the specific structures of the detection module are various. Exemplarily, the detection module includes a plurality of photosensitive units corresponding to the plurality of control areas in a one-to-one manner. The photosensitive unit includes a photosensitive chip and a signal processing unit 50 coupled to the photosensitive chip.

The photosensitive chip is located in the corresponding control area. Exemplarily, the photosensitive chip is located between the first electrode and the second electrode in the corresponding control area. Exemplarily, the photosensitive chip can be formed on a glass substrate by using ITO technology. The manufacturing principle and process of the photosensitive chip on the silicon base is well known in the art, and the implementation method can be directly used on the glass base, which will not be described in detail here. The photosensitive chip can detect the light intensity information formed by the light in the target control area when the light passes through the target control area and arrives at the human eye 40.

Exemplarily, the signal processing unit 50 is integrated with the control unit 301. Exemplarily, the signal processing unit 50 includes an analog-to-digital conversion unit ADC and a filter unit RC, and the analog-to-digital conversion unit is used to convert the light intensity information detected by the photosensitive chip into a digital signal, and the analog-to-digital converted light intensity information is transmitted to the filtering unit, the filtering unit filters the light intensity information, and the control unit 301 obtains the filtered light intensity information.

It is worth noting that when the photosensitive chip detects the light intensity information, there are two cases. In the first case, all photosensitive chips automatically detect the light intensity information of the corresponding control area and transmit the same to the corresponding signal processing unit. The control unit 301 obtains the light intensity information detected by the photosensitive unit corresponding to the target control area as required. In the second case, all the photosensitive chips perform the detection function according to the command signal provided by the control unit 301. That is, when the photosensitive chip receives the command signal from the control unit 301, the detection function is performed, and when the photosensitive chip does not receive the command signal from the control unit 301, the detection function is not performed. In this case, after determining the target control area, the control unit 301 only needs to send a command signal to the photosensitive chip corresponding to the target control area, and the photosensitive chip corresponding to the target control area detects the light intensity information corresponding to the target control area based on the above command signal, and transmit the light intensity information to the corresponding signal processing unit, and the control unit 301 only needs to obtain the light intensity information processed by the signal processing unit.

As shown in FIG. 7, the above-mentioned light shielding plate assembly further includes a power supply module 70, and the power supply module 70 is used to provide corresponding power supply signals for the control unit 301, the signal processing unit 50 and the transparent panel 10.

After obtaining the light intensity information, the control unit 301 can compare the light intensity information with a preset light intensity threshold, and when the light intensity information is greater than the light intensity threshold, adjust the light transmittance of the target control area, so that the light intensity information of the target control area is less than the light intensity threshold.

It should be noted that when the light intensity information is greater than the light intensity threshold, the light transmittance of the target control area is adjusted, and after the adjustment, the light intensity information corresponding to the target control area is detected again by the photosensitive unit, and the light intensity information is compared with a preset light intensity threshold again, and the above process are performed continuously until the light intensity information of the target control area is smaller than the light intensity threshold.

It should be noted that, the light intensity threshold is set to satisfy a condition that when the light intensity information is equal to or smaller than the light intensity threshold, the human eye 40 will not feel dazzling or dizzy.

In the light shielding plate assembly provided by the above embodiment, the light intensity information of the target control area can be detected by the photosensitive unit, and by comparing the light intensity information with the preset light intensity threshold, it is determined whether it is necessary to adjust the light transmittance of the target control area. When the light intensity information is greater than the light intensity threshold, the light transmittance of the target control area is automatically adjusted to achieve the effect of avoiding direct sunlight on the human eye 40.

Figure 10:
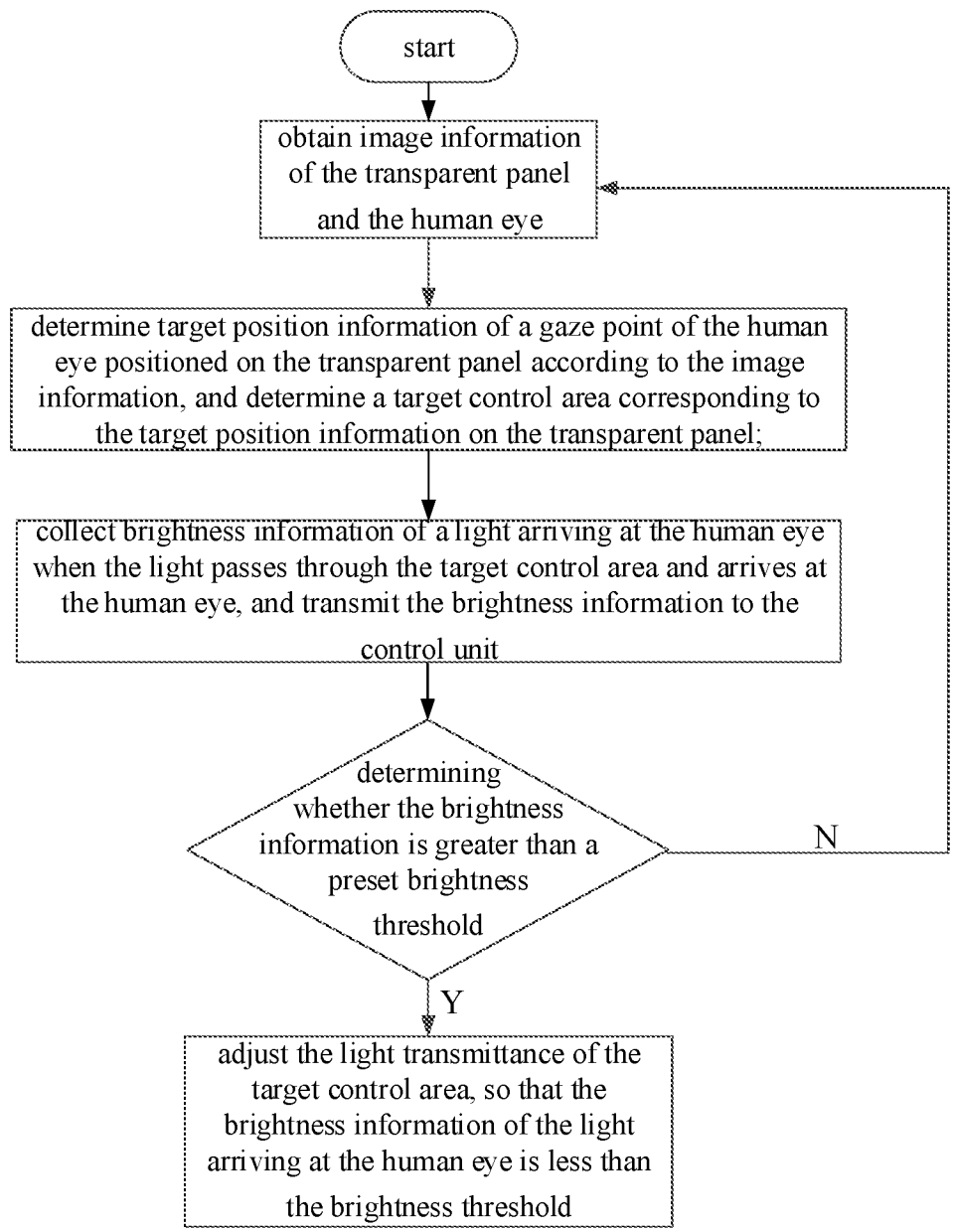
FIG. 10 is a second control flow chart of the light shielding plate assembly provided by the embodiment of the present disclosure.

As shown in FIG. 9 and FIG. 10, in some embodiments, the image collecting module 20 is multiplexed as the detection module; the control module 30 includes a control unit 301; the image collecting module 20 is specifically configured to: obtain brightness information of the light arriving at the human eye 40 when the light passes through the target control area and arrives at the human eye 40, and transmit the brightness information to the control unit 301;

The control unit 301 is configured to: compare the brightness information with a preset brightness threshold, and when the brightness information is greater than the brightness threshold, adjust the light transmittance of the target control area, so that the brightness information of the light arriving at the human eye 40 is less than the brightness threshold.

Specifically, the image collecting module 20 is multiplexed as the detection module, and the detection module can collect the brightness information of the light arriving at the human eye 40 when the light passes through the target control area and arrives at the human eye 40, and transmit the brightness information to the control unit 301.

The control unit 301 can compare the brightness information with a preset brightness threshold, and when the brightness information is greater than the brightness threshold, the light transmittance of the target control area is adjusted, so that the brightness information of the light arriving at the human eye 40 is less than the brightness threshold.

It should be noted that when the brightness information is greater than the brightness threshold, the light transmittance of the target control area is adjusted, and after adjustment, the image collecting module 20 collects the brightness information of the light arriving at the human eye 40 again when the light passes through the target control area and arrives at the human eyes 40, the brightness information of the light arriving at the human eye 40 is compared with the preset light brightness threshold again, and the above process is continuously repeated until the brightness information of the human eye 40 is less than the brightness threshold.

It should be noted that, the brightness threshold is set to satisfy the condition that when the brightness information is equal to or smaller than the brightness threshold, the human eye 40 will not feel dazzling or dizzy.

In the light shielding plate assembly provided by the above embodiment, there is no need to build a photosensitive unit in the transparent panel 10, only the brightness information of the light arriving at the human eye 40 is collected by the image collecting module 20, and the brightness information is compared with the preset light brightness threshold value, to determine whether it is necessary to adjust the light transmittance of the target control area. When the brightness information is greater than the brightness threshold, the target control area is automatically dimmed, so that the human eye can avoid direct sunlight.

As shown in FIG. 9, the above-mentioned light shielding plate assembly further includes a power supply module 70, and the power supply module 70 is used to provide corresponding power supply signals to the control unit 301 and the transparent panel 10.

Figure 11:
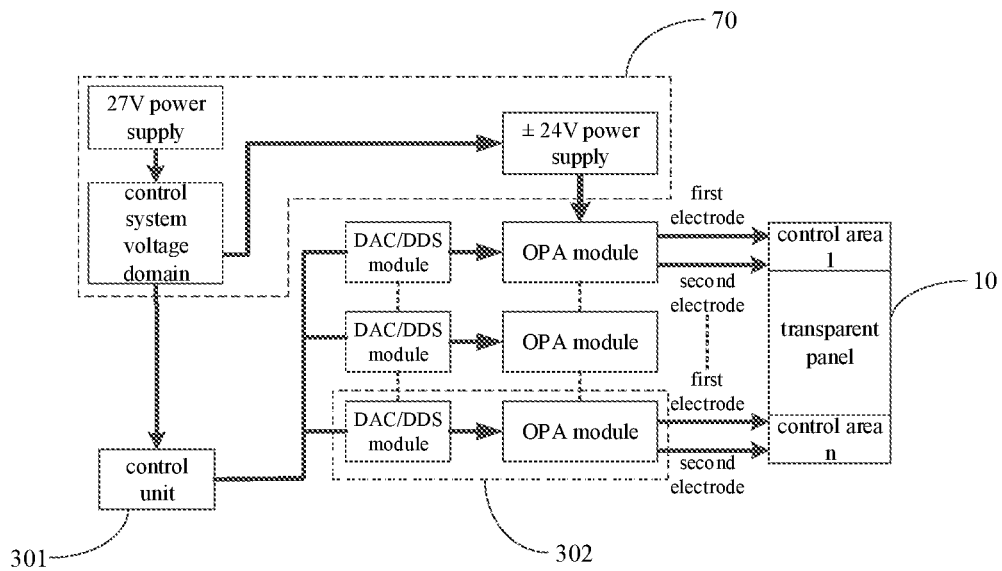
FIG. 11 is a schematic diagram of a first structure of a control module provided by an embodiment of the present disclosure.

As shown in FIG. 11, in some embodiments, the transparent panel 10 is divided into a plurality of control areas, and the transparent panel 10 includes a first electrode and a second electrode located in each of the control areas; the control module 30 includes: a control unit 301, and a plurality of processing units 302 respectively connected to the control unit 301, the plurality of processing units 302 are in one-to-one correspondence with the control areas; the processing unit 302 is coupled to the first electrode and the second electrode in the corresponding control area;

The control unit 301 is configured to: output a corresponding target control signal according to the optical information;

The target processing unit 302 corresponding to the target control area is configured to: convert the target control signal into a first target driving signal and a second target driving signal; and transmit the first target driving signal to the first electrode in the target control area connected to the target processing unit 302 and transmit the second target drive signal to the second electrode in the target control area connected to the target processing unit 302; to adjust the light transmission level of the transparent panel 10 in the target control area so that the optical information is within a preset range.

Specifically, the transparent panel 10 can be divided into a plurality of control areas. Exemplarily, the plurality of control areas include 16 areas to 32 areas.

The specific types of the processing unit 302 are various. Exemplarily, the processing unit 302 includes a digital-to-analog conversion unit DAC and a signal amplification unit OPA. The control unit 301 sends a control signal to the digital-to-analog conversion unit, and the digital-to-analog conversion unit converts the received control signal into an analog signal, which is further amplified by the signal amplifying unit to generate a first driving signal and a second driving signal. The first driving signal is transmitted to the first electrode in the corresponding control area, and the second driving signal is transmitted to the second electrode in the corresponding control area.

Exemplarily, the processing unit 302 includes a signal generator DDS and a signal amplifying unit OPA. The control unit 301 sends a control signal to the signal generator, and the signal generator generates two corresponding driving signals according to the received control signal, and the two driving signal are further amplified by the signal amplifying unit to generate the first driving signal and the second driving signal; the first driving signal is transmitted to the first electrode in the corresponding control area, and the second driving signal is transmitted to the second electrode in the corresponding control area.

It should be noted that the control unit 301 can output a control signal to each processing unit 302 according to actual needs, so that each of the processing units 302 can send the corresponding driving signal to the first electrode and the second electrode in the corresponding control area according to the received control signal, so that each control area can have a light transmittance level that meets actual requirements.

The above-mentioned light shielding plate assembly also includes a power supply module 70. Exemplarily, the power supply module 70 includes a 27V power supply and a control system voltage domain, the 27V power supply is provided to the control system voltage domain, and the control system voltage domain generates positive and negative 24V power supply for signal amplification unit OPA, and generates other corresponding power signal to the control unit 301 at the same time.

When actually adjusting the light transmittance of the target control area of the transparent panel 10, the control unit 301 can output a corresponding target control signal according to the optical information, and the target control signal is converted into the first target driving signal and the second target driving signal, so that the light transmittance of the transparent panel 10 in the target control area is reduced, and the optical information obtained again can be within a preset range.

In the light shielding plate assembly provided by the above embodiment, the control unit 301 and the plurality of processing units 302 can adjust the plurality of control areas independently, so as to better control the light transmittance of the transparent panel 10 in each area.

Figure 12:
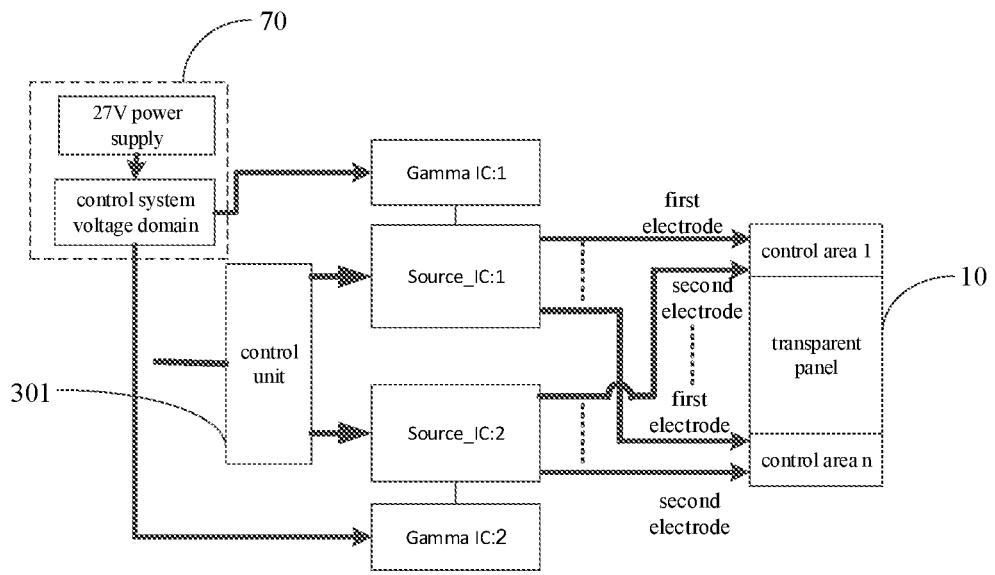
FIG. 12 is a schematic diagram of a second structure of a control module provided by an embodiment of the present disclosure.

As shown in FIG. 12, in some embodiments, the transparent panel 10 is divided into a plurality of control areas, and the transparent panel 10 includes a first electrode and a second electrode located in each of the control areas; the control module 30 includes: a control unit 301, a first driver chip Source_IC: 1 coupled to the control unit 301, and a second driver chip Source_IC: 2 coupled to the control unit 301, the first driver chip is respectively coupled to the first electrode in each control area, and the second driver chip is respectively coupled to the second electrode in each control area;

The control unit 301 is configured to: output a corresponding target control signal according to the optical information;

The first driver chip is used to: output the corresponding first target driving signal to the first electrode in the target control area under the control of the target control signal; the second driver chip is used to: output the corresponding second target driving signal to the second electrode in the target control area under the control of the target control signal in the target control area; to adjust the light transmittance of the transparent panel 10 in the target control area, so that the optical information is within the preset range.

Specifically, the transparent panel 10 can be divided into a plurality of control areas. Exemplarily, the plurality of control areas require 1024 driving channels.

The control unit 301 is respectively coupled to the first driver chip and the second driver chip, and is used for outputting control signals to the first driver chip and the second driver chip. The first driver chip is respectively coupled to the first electrode in each control area, and the first driver chip is used for outputting the first driving signal to the first electrode in each control area under the control of the received control signal. The second driver chip is respectively coupled to the second electrode in each control area, and the second driver chip is used for outputting the second driving signal to the second electrode in each control area under the control of the received control signal.

It is worth noting that, according to actual needs, the first driver chip and the second driver chip can output corresponding driving signals to the first electrode and the second electrode in each control area, so that each control area can have light transmission level meeting practical requirements.

In addition, the first driver chip and the second driver chip can be selected from a driver chip commonly used in the display field, and the driver chip can realize the output of a high-voltage square wave. By setting the control module 30 to include a first driver chip and a second driver chip, the simultaneous output of positive and negative polarities may achieved, which meets the driving voltage requirements of the first electrode and the second electrode in the transparent panel 10.

When actually adjusting the light transmittance of the target control area of the transparent panel 10, the control unit 301 can output a corresponding target control signal according to the optical information; the first driver chip outputs the corresponding first target driving signal to the first electrode in the target control area under the control of the target control signal; the second driver chip outputs the corresponding second target driving signal to the second electrode in the target control area under the control of the target control signal; to adjust the light transmittance of the transparent panel 10 in the target control area, so that the optical information collected again can be within the preset range.

In the above configuration, the control module 30 includes a first driver chip and a second driver chip, and can control the polarity change of the first electrode and the second electrode through the first driver chip and the second driver chip according to the driving requirements of the liquid crystal, avoid the polarization of the liquid crystal, and effectively prolong the service life of the transparent panel 10.

The light shielding plate assembly provided in the above embodiment can control the frequency of adjusting the light transmittance of the transparent panel 10 by controlling the frequency of the control signal outputted by the control unit 301, thereby adjusting the light transmittance of the transparent panel 10.

As shown in FIG. 12, in some embodiments, the control module 30 further includes: a first gamma chip Gamma IC: 1 and a second gamma chip Gamma IC: 2;
the first gamma chip is coupled to the first driver chip, and is used for adjusting an amplitude of the first driving signal outputted by the first driver chip;

The second gamma chip is coupled to the second driver chip, and is used for adjusting an amplitude of the second driving signal outputted by the second driver chip.

Specifically, in the above configuration, the control module 30 includes the first gamma chip and the second gamma chip, and can adjust the output voltage amplitude of the gamma chip according to the control requirements, thereby changing the voltage amplitude outputted by the driver chip, achieving the effect that the amplitude voltage can be controlled at any time according to the dimming needs. The voltage amplitude outputted by the driver chip is adjusted by the first gamma chip and the second gamma chip, so that the change of the light transmittance of the light shielding plate has better continuity.

The above-mentioned light shielding plate assembly further includes a power supply module 70. Exemplarily, the power supply module 70 includes a 27V power supply and a control system voltage domain, the 27V power supply is provided to the control system voltage domain, and the control system voltage domain generates a corresponding power supply signal to the control unit 301 and the gamma chips.

In the light shielding plate assembly provided by the above-mentioned embodiment, by adopting the driving mode of dual driver chips, the functions of satisfying the requirement of multi-channel dimming, and having adjustable polarity, adjustable amplitude and adjustable frequency are achieved.

As shown in FIG. 1, in some embodiments, the light shielding plate assembly may further include a voice module 60, for example, the voice module 60 includes a voice speaker. The voice module 60 can broadcast content under the control of the control module 30. Exemplarily, in the initial state, the control module 30 may remind the driver of the sitting posture through the voice module 60, so that the image collecting module 20 can obtain more accurate image information.

Embodiments of the present disclosure further provide a vehicle, including the light shielding plate assembly provided by the above embodiments.

In the light shielding plate assembly provided by the above embodiment, when the strong light passes through the target control area and arrives at the human eye 40, the light transmittance of the target control area can be controlled to reduce the brightness of the light arrived at the human eye 40, thereby solving the problems of dizziness and blind spots of vision caused by the strong light arriving at the human eye 40. Moreover, the light shielding plate assembly provided by the above embodiment can automatically adjust the target control area of the transparent panel 10 to change color according to the position where the incident light arrives at the human eye 40, and ensure that other areas do not change color. It can automatically adjust the color change of the target control area in real time according to the lighting conditions. The light shielding plate assembly provided by the above embodiment combines the technical means of multi-area dimming, achieves the technical effect of automatic dimming in different areas of the transparent panel 10, and solves the technical problem of dizziness of the human eye 40 caused by direct sunlight.

When the vehicle provided by the embodiment of the present disclosure includes the light shielding plate assembly provided by the above embodiment, the problem of visual dizziness of the human eye 40 caused by direct sunlight during the driving process of the vehicle can be solved, and at the same time, the occurrence of darkening of the external scene and the poor field of view can be avoided.

Embodiments of the present disclosure further provide a method for controlling a light shielding plate assembly, which is used to control the light shielding plate assembly provided in the above-mentioned embodiments, where the light shielding plate assembly includes a transparent panel 10, an image collecting module 20, a detection module, and a control module 30. Wherein, the transparent panel 10 is configured to block the light passing through the transparent panel 10 and arriving at the human eye 40, and the light transmittance of the transparent panel 10 is adjustable; the image collecting module 20 is located on a side of the transparent panel 10 away from the human eye 40; the control method includes:

Obtaining, by the image collecting module 20, image information of the transparent panel 10 and the human eye 40;

Determining, by the control module 30, the target position information of the gaze point of the human eye 40 positioned on the transparent panel 10 according to the image information, and determining the target control area on the transparent panel 10 corresponding to the target position information;

Detecting, by the detection module, the corresponding optical information when the light passes through the target control area and arrives at the human eye 40;

Adjusting, by the control module 30, the light transmittance of the transparent panel 10 in the target control area according to the optical information, so that the optical information is within a preset range.

In the control method of the light shielding plate assembly provided by the embodiment of the present disclosure, the image collecting module 20 obtains the image information of the transparent panel 10 and the human eye 40; the control module 30 can determine the target position information of the gaze point of the human eye 40 positioned on the transparent panel 10 according to the image information, and determine the target control area corresponding to the target position information on the transparent panel 10; the detection module can detect the optical information when the light passes through the target control area and arrives at the human eye 40; the control module 30 can also adjust the light transmittance of the transparent panel 10 in the target control area according to the optical information, so that the optical information is within a preset range. Therefore, the light shielding plate assembly is controlled by the control method provided by the embodiment of the present disclosure, when the strong light passes through the target control area and arrives at the human eye 40, the brightness of the light arrived at the human eye 40 can be reduced by controlling the light transmittance of the target control area, thereby avoiding the dizziness problem and the blind spot problem caused by the strong light irradiating the human eye 40. Moreover, the light shielding plate assembly provided by the embodiment of the present disclosure can automatically adjust the corresponding target control area of the transparent panel 10 to change color according to the position where the incident light arrives at the human eye 40, and ensure that other areas do not change color. The function of automatically adjusting the color change of the target control area in real time according to the lighting conditions is realized.

When using the control method for the light shielding plate assembly provided by the embodiment of the present disclosure to control the light shielding plate assembly, the technical means of multi-area dimming are combined, so as to achieve the technical effect of automatic dimming in different areas of the transparent panel 10, and solve the technical problem of dizziness of the human eye 40 caused by direct sunlight.

In some embodiments, the step of obtaining, by the image collecting module 20, the image information of the transparent panel 10 and the human eye 40 specifically includes:

collecting a first image including only the transparent panel 10, and a second image including both the transparent panel 10 and the human eye 40;

The step of determining, by the control module 30, the target position information of the gaze point of the human eye 40 positioned on the transparent panel 10 according to the image information specifically includes:

Processing the first image to obtain a set of numerical values corresponding to each pixel in the first image, forming a first numerical value matrix corresponding to the first image, and establishing a correspondence table between the first numerical value matrix and the coordinate position information of the transparent panel 10;

processing the second image to obtain a set of numerical values corresponding to each pixel in the second image to form a second numerical value matrix corresponding to the second image;

Comparing the first numerical value matrix and the second numerical value matrix, determining the target numerical value in the first numerical value matrix that is different from the second numerical value matrix, and determining position information corresponding to the target numerical value from the correspondence table as the target location information;

The step of determining the target control area corresponding to the target position information on the transparent panel 10 specifically includes:

According to a distance between the human eye 40 and the transparent panel 10 and a field of view of the human eye 40, determining an area value of the control area to be divided of the transparent panel 10;

Dividing the transparent panel 10 into a plurality of control areas according to the area value;

Determining a control area corresponding to the target location information among the plurality of control areas as a target control area.

When using the control method for the light shielding plate assembly provided in the above embodiment to control the light shielding plate assembly, the control unit 301 can determine the first numerical value matrix corresponding to the first image and a second numerical value matrix corresponding to the second image by processing the first image and the second image collected by the image collecting module 20; by comparing the first numerical value matrix and the second numerical value matrix, determine the target position information from the determined correspondence table. The control unit 301 can further divide the transparent panel 10 into a plurality of control areas, and determine the control area corresponding to the target position information among the plurality of control areas as the target control area, thereby realizing the determination of the target control area of the gaze point of the human eye 40 on the transparent panel 10.

In some embodiments, the transparent panel 10 is divided into a plurality of control areas; the detection module includes: a plurality of photosensitive units corresponding to the plurality of control areas in a one-to-one manner; the control module 30 includes a control unit 301;

The step of detecting, by the detection module, the optical information corresponding to the light passing through the target control area and arriving at the human eye 40 specifically includes:

Detecting, by the target photosensitive unit in the target control area, the light intensity information formed by the light in the target control area when the light passes through the target control area and arrives at the human eye 40;

The step of adjusting, by the control module 30, the light transmittance of the transparent panel 10 in the target control area according to the optical information, so that the optical information is within a preset range specifically include:

Obtaining, by the control unit 301, the light intensity information, comparing the light intensity information with a preset light intensity threshold, and when the light intensity information is greater than the light intensity threshold, adjusting the light transmittance of the target control area, so that the light intensity information of the target control area is smaller than the light intensity threshold.

When the light shielding plate assembly is controlled by the control method of the light shielding plate assembly provided by the above embodiment, the light intensity information of the target control area can be detected by the photosensitive unit, and the light intensity information can be compared with the preset light intensity threshold to determine whether to adjust the light transmittance of the target control area, and when the light intensity information is greater than the light intensity threshold, the target control area is automatically dimmed, so as to avoid the direct strong sunlight arriving at the human eye 40.

In some embodiments, the image collecting module 20 is multiplexed as the detection module; the control module 30 includes a control unit 301;

The step of detecting, by the detection module, the optical information when the light passes through the target control area and arrives at the human eye 40 specifically includes:

Collecting brightness information of the light arriving at the human eye 40 when the light passes through the target control area and arrives at the human eye 40, and transmitting the brightness information to the control unit 301;

The step of adjusting, by the control module 30, the light transmittance of the transparent panel 10 in the target control area according to the optical information, so that the optical information is within a preset range specifically include:

Comparing, by the control unit 301, the brightness information with a preset light brightness threshold, and when the brightness information is greater than the light brightness threshold, adjusting the light transmittance of the target control area so that the bright information of the light arriving at the human eye 40 is less than the light brightness threshold.

When the control method of the light shielding plate assembly provided by the above-mentioned embodiment is used to control the light shielding plate assembly, it is not necessary to build a photosensitive unit in the transparent panel 10, and only the brightness information of the light arriving at the human eye 40 is collected by the image collecting module 20, and the brightness information is compared with a preset light brightness threshold to determine whether the light transmittance of the target control area needs to be adjusted. When the brightness information is greater than the light brightness threshold, the target control area is automatically dimmed, thereby achieving the effect of avoiding the strong sunlight directly arriving at the human eye.

In some embodiments, the transparent panel 10 is divided into a plurality of control areas, the transparent panel 10 includes a first electrode and a second electrode located in each of the control areas; the control module 30 includes: a control unit 301, and a plurality of processing units respectively connected to the control units 301, the processing units are in one-to-one correspondence with the control areas; the processing unit is respectively coupled to the first electrode and the second electrode in the corresponding control area;

The step of adjusting, by the control module 30, the light transmittance of the transparent panel 10 in the target control area according to the optical information, so that the optical information is within a preset range, specifically include:

Outputting, by the control unit 301, a corresponding target control signal according to the optical information;

Converting, by the target processing unit corresponding to the target control area, the target control signal into a first target driving signal and a second target driving signal; and transmitting the first target driving signal to the first electrode in the target control area coupled to the target processing unit, and transmitting the second target drive signal to the second electrode in the target control area coupled to the target processing unit; adjusting the light transmittance of the transparent panel 10 in the target control area, so that the optical information is within a preset range.

When the control method of the light shielding plate assembly provided in the above-mentioned embodiment is used to control the light shielding plate assembly, the control unit 301 and the plurality of processing units 302 can realize the independent adjustment of the plurality of control areas, so as to control the light transmittance of the transparent panel 10 in each area.

In some embodiments, the transparent panel 10 is divided into a plurality of control areas, the transparent panel 10 includes a first electrode and a second electrode located in each of the control areas; the control module 30 includes: a control unit 301, a first driver chip coupled to the control unit 301, and a second driver chip coupled to the control unit 301, the first driver chip is respectively coupled to the first electrode in each control area, and the second driver chip is respectively coupled to the second electrode in each control area;

The control unit 301 outputs a corresponding target control signal according to the optical information;

The first driver chip is used to: output the corresponding first target driving signal to the first electrode in the target control area under the control of the target control signal; the second driver chip is used to: output the corresponding second target driving signal to the second electrode in the target control area under the control of the target control signal in the target control area; to adjust the light transmittance of the transparent panel 10 in the target control area, so that the optical information is within the preset range.

In some embodiments, the control module 30 includes: a first gamma chip and a second gamma chip; the first gamma chip is coupled to the first driver chip, and the second gamma chip is coupled to the second driver chip; the control method further includes:

Adjusting, by the first gamma chip, an amplitude of the first driving signal outputted by the first driver chip;

Adjusting, by the second gamma chip, an amplitude of the second driving signal outputted by the second driver chip.

In the above configuration, the control module 30 includes the first gamma chip and the second gamma chip, and can adjust the output voltage amplitude of the gamma chip according to the control requirements, thereby changing the voltage amplitude outputted by the driver chip, achieving the effect that the amplitude voltage can be controlled at any time according to the dimming needs. The voltage amplitude outputted by the driver chip is adjusted by the first gamma chip and the second gamma chip, so that the change of the light transmittance of the light shielding plate has better continuity.

When the control method of the light shielding plate assembly provided by the above embodiment is used to control the light shielding plate assembly, by adopting the driving mode of dual driver chips, the functions of satisfying the requirement of multi-channel dimming, and having adjustable polarity, adjustable amplitude and adjustable frequency are achieved.

An embodiment of the present disclosure also provides a control device of the light shielding plate assembly, the control device is applied to a vehicle, the control device includes: a memory and a processor, the processor is configured to execute the above method stored in the memory.

The processor is specifically used to execute the following instructions:
  obtaining image information of the transparent panel 10 and the human eye 40;
  determining target position information on the transparent panel 10 where a gaze point of the human eye 40 is positioned according to the image information, and determining a target control area corresponding to the target position information on the transparent panel 10;
  detecting optical information when the light passes through the target control area and arrives at the human eye 40;
  adjusting light transmittance of the transparent panel 10 in the target control area according to the optical information, so that the optical information is within a preset range.

Exemplarily, the specific types of the memory are various. Exemplarily, a read-only memory (ROM) or a random access memory (RAM) can be selected.

In the control device for the light shielding plate assembly provided by the embodiment of the present disclosure, when the strong light passes through the target control area and arrives at the human eye 40, the light transmittance of the target control area can be controlled, so that the brightness of the light arrived at the human eye 40 is reduced, thereby avoiding the dizziness problem and the blind spot problem caused by the strong light arriving at the human eye 40. Moreover, the control device for the light shielding plate assembly provided by the embodiment of the present disclosure can automatically adjust the corresponding target control area of the transparent panel 10 to change color according to the position where the light arrives at the human eye 40, and ensure that other areas do not change color. The function of automatically adjusting the color change of the target control area in real time according to the lighting conditions is realized while the field of view is guaranteed.

The control device of the shading plate module provided by the embodiment of the present disclosure combines the technical means of dimming at a plurality of areas, achieves the technical effect of automatic dimming in different areas of the transparent panel 10, and solves the technical problem of dizziness of the human eye 40 caused by direct sunlight. When the light shielding plate assembly provided by the embodiment of the present disclosure is applied to a vehicle, the problem of visual dizziness of the human eye 40 caused by direct sunlight during driving of the vehicle can be solved, and at the same time, the occurrence of a darkened external scene and a poor visual field can be avoided.

The processor is also configured to execute the following instructions stored in the memory:
  collecting a first image including only the transparent panel 10, and a second image including both the transparent panel 10 and the human eye 40;
  processing the first image to obtain a set of values corresponding to each pixel in the first image to form a first numerical value matrix corresponding to the first image, establish a correspondence table between the first numerical value matrix and coordinate position information of the transparent panel 10;
  processing the second image to obtain a set of values corresponding to each pixel in the second image to form a second numerical value matrix corresponding to the second image;
  Comparing the first numerical value matrix and the second numerical value matrix to determine target numerical value in the first numerical value matrix that is different from the second numerical value matrix, and determine position information corresponding to the target numerical value from the correspondence table as the target location information;
  According to a distance between the human eye 40 and the transparent panel 10 and a field of view of the human eye 40, determining an area value of the control area to be divided of the transparent panel 10;
  Dividing the transparent panel 10 into a plurality of control areas according to the area value;
  Determining a control area corresponding to the target location information among the plurality of control areas as a target control area.

The processor is also configured to execute the following instructions stored in the memory:
  Detecting the light intensity information formed by the light in the target control area when the light passes through the target control area and arrives at the human eye 40;
  The step of adjusting the light transmittance of the transparent panel 10 in the target control area according to the optical information, so that the optical information is within a preset range specifically includes:
  Obtaining the light intensity information, comparing the light intensity information with a preset light intensity threshold, and adjusting the light transmittance of the target control area when the light intensity information is greater than the light intensity threshold, so that the light intensity information of the target control area is less than the light intensity threshold.

The processor is also configured to execute the following instructions stored in the memory:
  Collecting the brightness information of the light arriving at the human eye 40 when the light passes through the target control area and arrives at the human eye 40, and transmitting the brightness information to the control unit 301;
  The step of adjusting the light transmittance of the transparent panel 10 in the target control area according to the optical information, so that the optical information is within a preset range specifically includes:

Comparing the brightness information with a preset light brightness threshold, when the brightness information is greater than the light brightness threshold, adjusting the light transmittance of the target control area, so that the brightness information of the light arriving at the human eye 40 is less than the light brightness threshold.

The processor is also configured to execute the following instructions stored in the memory:

outputting a corresponding target control signal according to the optical information;

Converting the target control signal into a first target driving signal and a second target driving signal; and transmitting the first target driving signal to the first electrode in the target control region, transmitting the first target driving signal to the second electrode in the target control area; to adjust the light transmittance of the transparent panel 10 in the target control area, so that the optical information is within a preset range.

The processor is also configured to execute the following instructions stored in the memory:

outputting a corresponding target control signal according to the optical information;

Under the control of the target control signal, the corresponding first target driving signal is output to the first electrode in the target control area; under the control of the target control signal, the corresponding second target driving signal is output to the second electrode in the target control area; to adjust the light transmittance of the transparent panel 10 in the target control area, so that the optical information is within a preset range.

The processor is also configured to execute the following instructions stored in the memory:

adjusting an amplitude of the first driving signal outputted by the first driver chip;

adjusting an amplitude of the second driving signal outputted by the second driver chip.

It should be noted that each embodiment in this specification is described in a progressive manner, and the same and similar parts between the various embodiments may be referred to each other, and each embodiment focuses on the differences from other embodiments. In particular, as for the method embodiment, since it is basically similar to the product embodiment, the description is relatively simple, and the relevant part can be referred to the description of the product embodiment.

Unless otherwise defined, technical or scientific terms used in this disclosure shall have the ordinary meaning as understood by one of ordinary skill in the art to which the present disclosure belongs. As used in the present disclosure, "first", "second" and similar terms do not denote any order, quantity, or importance, but are merely used to distinguish the various components. "Including" or "comprising" and similar words mean that the elements appearing before the word encompass the elements recited after the word and their equivalents, but do not exclude other elements. Words like "connected" or "coupled" are not limited to physical or mechanical connections, but may include electrical connections, whether direct or indirect. "Up", "Down", "Left", "Right", etc. are only used to represent the relative positional relationship, and when the absolute position of the described object changes, the relative positional relationship may also change accordingly.

It will be understood that when an element such as a layer, film, region or substrate is referred to as being "on" or "under" another element, it can be "directly on" or "under" the other element, or intermediate elements may be present.

In the foregoing description of the embodiments, the particular features, structures, materials or characteristics may be combined in any suitable manner in any one or more of the embodiments or examples.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light shielding plate assembly, comprising: a transparent panel, an image collecting module, a detection module and a control module; wherein, the transparent panel is configured to block a light passing through the transparent panel and arriving at a human eye, and a light transmittance of the transparent panel is adjustable, wherein the transparent panel is divided into a plurality of control areas, and each control area comprises a corresponding coordinate information range;

the image collecting module is located on a side of the transparent panel away from the human eye, and is configured to obtain image information of the transparent panel and the human eye;

the control module is configured to: determine target position information of a gaze point of the human eye positioned on the transparent panel according to the image information, and determine a target control area corresponding to the target position information among the plurality of control areas as the target control area, wherein the target location information comprises coordinate information, and the target position information is located in a coordinate information range corresponding to the target control area;

the detection module is configured to: detect optical information when the light passes through the target control area and arrives at the human eye;

the control module is further configured to: adjust the light transmittance of the transparent panel in the target control area according to the optical information, so that the optical information is within a preset range.

2. The light shielding plate assembly according to claim 1, wherein the image collecting module is configured to:

collecting a first image including only the transparent panel, and a second image including both the transparent panel and the human eye;

the control module includes a control unit, and the control unit is configured to:

process the first image to obtain a set of values corresponding to each pixel in the first image to form a first numerical value matrix corresponding to the first image, establish a correspondence table between the first numerical value matrix and coordinate position information of the transparent panel;

process the second image to obtain a set of values corresponding to each pixel in the second image, to form a second numerical value matrix corresponding to the second image;

compare the first numerical value matrix and the second numerical value matrix to determine a target numerical value in the first numerical value matrix that is different from the second numerical value matrix, and determine position information corresponding to the target numerical value from the correspondence table as the target location information;

the control unit is further configured to:
determine an area value of the control area to be divided of the transparent panel according to a distance between the human eye and the transparent panel and a field of view of the human eye;
divide the transparent panel into a plurality of control areas according to the area value;
determine a control area corresponding to the target location information among the plurality of control areas as a target control area.

3. The light shielding plate assembly according to claim 1, wherein the transparent panel is divided into a plurality of control areas; the detection module includes: a plurality of photosensitive units corresponding to the plurality of control areas in a one-to-one manner;
a target photosensitive unit in the target control area is used to detect light intensity information formed by a light in the target control area when the light passes through the target control area and arrives at the human eye;
the control module includes a control unit, and the control unit is configured to: obtain the light intensity information, and compare the light intensity information with a preset light intensity threshold, when the light intensity information is greater than the light intensity threshold, adjust light transmittance of the target control area, so that light intensity information of the target control area is smaller than the light intensity threshold.

4. The light shielding plate assembly according to claim 1, wherein the image collecting module is multiplexed as the detection module; the control module includes a control unit; the image collecting module is specifically configured to: collect brightness information of a light arriving at the human eye when the light passes through the target control area and arrives at the human eye, and transmit the brightness information to the control unit;
the control unit is configured to: compare the brightness information with a preset brightness threshold, and when the brightness information is greater than the brightness threshold, adjust the light transmittance of the target control area, so that the brightness information of the light arriving at the human eye is less than the brightness threshold.

5. The light shielding plate assembly of claim 1, wherein the transparent panel is divided into a plurality of control areas, and the transparent panel includes a first electrode and a second electrode located in each of the plurality of control areas; the control module includes: a control unit, and a plurality of processing units respectively connected to the control unit, the plurality of processing units are in one-to-one correspondence with the plurality of control areas; each processing unit is coupled to the first electrode and the second electrode in a corresponding control area;
the control unit is configured to: output a corresponding target control signal according to the optical information;
the target processing unit corresponding to the target control area is configured to: convert the target control signal into a first target driving signal and a second target driving signal; and transmit the first target driving signal to the first electrode in the target control area connected to the target processing unit and transmit the second target driving signal to the second electrode in the target control area connected to the target processing unit; to adjust the light transmission of the transparent panel in the target control area so that the optical information is within the preset range.

6. The light shielding plate assembly of claim 1, wherein the transparent panel is divided into a plurality of control areas, and the transparent panel includes a first electrode and a second electrode located in each of the plurality of control areas; the control module includes: a control unit, a first driver chip coupled to the control unit, and a second driver chip coupled to the control unit, the first driver chip is coupled to the first electrode in each control area, and the second driver chip is coupled to the second electrode in each control area;
the control unit is configured to: output a corresponding target control signal according to the optical information;
the first driver chip is configured to: output a corresponding first target driving signal to the first electrode in the target control area under the control of the target control signal; the second driver chip is configured to: output a corresponding second target driving signal to the second electrode in the target control area under the control of the target control signal; to adjust the light transmittance of the transparent panel in the target control area, so that the optical information is within the preset range.

7. The light shielding plate assembly according to claim 6, wherein the control module comprises: a first gamma chip and a second gamma chip;
the first gamma chip is coupled to the first driver chip, and is used for adjusting an amplitude of a first driving signal outputted by the first driver chip;
the second gamma chip is coupled to the second driver chip, and is used for adjusting an amplitude of a second driving signal outputted by the second driver chip.

8. A vehicle comprising the light shielding plate assembly according to claim 1.

9. A control method of a light shielding plate assembly, the light shielding plate assembly comprising a transparent panel, an image collecting module, a detection module, and a control module, wherein, the transparent panel is configured to block a light passing through the transparent panel and arriving at a human eye, and a light transmittance of the transparent panel is adjustable, wherein the transparent panel is divided into a plurality of control areas, and each control area comprises a corresponding coordinate information range; the image collecting module is located on a side of the transparent panel away from the human eye; the control method includes:
obtaining, by the image collecting module, image information of the transparent panel and the human eye;
determining, by the control module, target position information of a gaze point of the human eye positioned on the transparent panel according to the image information, and determining a target control area corresponding to the target position information among the plurality of control areas as the target control area, wherein the target location information comprises coordinate information, and the target position information is located in a coordinate information range corresponding to the target control area;
detecting, by the detection module, optical information when the light passes through the target control area and arrives at the human eye;
adjusting, by the control module, the light transmittance of the transparent panel in the target control area according to the optical information, so that the optical information is within a preset range.

10. The control method according to claim 9, wherein the step of obtaining, by the image collecting module, the image information of the transparent panel and the human eye includes:

collecting a first image including only the transparent panel, and a second image including both the transparent panel and the human eye;
   the step of determining, by the control module, target position information of a gaze point of the human eye positioned on the transparent panel according to the image information includes:
   processing the first image to obtain a set of values corresponding to each pixel in the first image to form a first numerical value matrix corresponding to the first image, establish a correspondence table between the first numerical value matrix and coordinate position information of the transparent panel;
   processing the second image to obtain a set of values corresponding to each pixel in the second image, to form a second numerical value matrix corresponding to the second image;
   comparing the first numerical value matrix and the second numerical value matrix to determine a target numerical value in the first numerical value matrix that is different from the second numerical value matrix, and determine position information corresponding to the target numerical value from the correspondence table as the target location information;
   the step of determining a target control area corresponding to the target position information on the transparent panel includes:
   determining an area value of the control area to be divided of the transparent panel according to a distance between the human eye and the transparent panel and a field of view of the human eye;
   dividing the transparent panel into a plurality of control areas according to the area value;
   determining a control area corresponding to the target location information among the plurality of control areas as a target control area.

11. The control method according to claim 9, wherein the transparent panel is divided into a plurality of control areas; the detection module includes: a plurality of photosensitive units corresponding to the plurality of control areas in a one-to-one manner; the control module 30 includes a control unit;

the step of detecting, by the detection module, the optical information corresponding to the light passing through the target control area and arriving at the human eye specifically includes:
   detecting, by a target photosensitive unit in the target control area, light intensity information formed by a light in the target control area when the light passes through the target control area and arrives at the human eye;
   the step of adjusting, by the control module, the light transmittance of the transparent panel in the target control area according to the optical information, so that the optical information is within a preset range include:
   obtaining, by the control unit, the light intensity information, comparing the light intensity information with a preset light intensity threshold, and when the light intensity information is greater than the light intensity threshold, adjusting light transmittance of the target control area, so that light intensity information of the target control area is smaller than the light intensity threshold.

12. The control method according to claim 9, wherein the image collecting module is multiplexed as the detection module; the control module includes a control unit;

the step of detecting, by the detection module, the optical information when the light passes through the target control area and arrives at the human eye specifically includes:
   collecting brightness information of a light arriving at the human eye when the light passes through the target control area and arrives at the human eye, and transmitting the brightness information to the control unit;
   the step of adjusting, by the control module, the light transmittance of the transparent panel in the target control area according to the optical information, so that the optical information is within a preset range include:
   comparing, by the control unit, the brightness information with a preset light brightness threshold, and when the brightness information is greater than the light brightness threshold, adjusting the light transmittance of the target control area so that the bright information of the light arriving at the human eye is less than the light brightness threshold.

13. The control method according to claim 9, wherein the transparent panel is divided into a plurality of control areas, the transparent panel includes a first electrode and a second electrode located in each of the plurality of control areas; the control module includes: a control unit, and a plurality of processing units respectively connected to the control units, the processing units are in one-to-one correspondence with the plurality of control areas; each processing unit is coupled to the first electrode and the second electrode in a corresponding control area;

the step of adjusting, by the control module, the light transmittance of the transparent panel in the target control area according to the optical information, so that the optical information is within a preset range, include:
   outputting, by the control unit, a corresponding target control signal according to the optical information;
   converting, by the target processing unit corresponding to the target control area, the target control signal into a first target driving signal and a second target driving signal; and transmitting the first target driving signal to the first electrode in the target control area coupled to the target processing unit, and transmitting the second target driving signal to the second electrode in the target control area coupled to the target processing unit; adjusting the light transmittance of the transparent panel in the target control area, so that the optical information is within the preset range.

14. The control method according to claim 9, wherein the transparent panel is divided into a plurality of control areas, the transparent panel includes a first electrode and a second electrode located in each of the plurality of control areas; the control module includes: a control unit, a first driver chip coupled to the control unit, and a second driver chip coupled to the control unit, the first driver chip is coupled to the first electrode in each control area, and the second driver chip is coupled to the second electrode in each control area;

the control unit is configured to output a corresponding target control signal according to the optical information;

the first driver chip is configured to: output a corresponding first target driving signal to the first electrode in the target control area under the control of the target control signal; the second driver chip is configured to: output a corresponding second target driving signal to the second electrode in the target control area under the control of the target control signal; to adjust the light transmittance of the transparent panel in the target control area, so that the optical information is within the preset range.

15. The control method according to claim 14, wherein the control module comprises a first gamma chip and a second gamma chip; the first gamma chip is coupled to the first driver chip, and the second gamma chip is coupled to the second driver chip; the control method further includes:
adjusting, by the first gamma chip, an amplitude of a first driving signal outputted by the first driver chip;
adjusting, by the second gamma chip, an amplitude of a second driving signal outputted by the second driver chip.

16. A control device of a light shielding plate assembly, applied to a vehicle, wherein the light shielding plate assembly comprises a transparent panel, the transparent panel is divided into a plurality of control areas, and each control area comprises a corresponding coordinate information range, and the control device comprising: a memory and a processor, the processor being configured to execute the following instructions stored in the memory:
obtaining image information of a transparent panel and a human eye;
determining target position information of a gaze point of the human eye positioned on the transparent panel according to the image information, and determining a target control area corresponding to the target position information among the plurality of control areas as the target control area, wherein the target location information comprises coordinate information, and the target position information is located in a coordinate information range corresponding to the target control area;
detecting optical information when the light passes through the target control area and arrives at the human eye;
adjusting the light transmittance of the transparent panel in the target control area according to the optical information, so that the optical information is within a preset range.

* * * * *